United States Patent
Anderson et al.

(10) Patent No.: US 9,914,383 B2
(45) Date of Patent: *Mar. 13, 2018

(54) OVER THE WHEEL WELL LIQUID STORAGE TANK

(71) Applicants: Kenneth S. Anderson, Rexburg, ID (US); Klint S. Anderson, Rexburg, ID (US)

(72) Inventors: Kenneth S. Anderson, Rexburg, ID (US); Klint S. Anderson, Rexburg, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 15/612,836

(22) Filed: Jun. 2, 2017

(65) Prior Publication Data

US 2017/0267155 A1    Sep. 21, 2017

Related U.S. Application Data

(63) Continuation of application No. 14/514,235, filed on Oct. 14, 2014, now Pat. No. 9,669,751.

(51) Int. Cl.
*B60R 7/00* (2006.01)
*B60R 9/00* (2006.01)
*B60P 3/22* (2006.01)
*B62D 33/02* (2006.01)
*B62D 33/023* (2006.01)

(52) U.S. Cl.
CPC .............. *B60P 3/2215* (2013.01); *B60R 9/00* (2013.01); *B62D 33/02* (2013.01); *B62D 33/023* (2013.01)

(58) Field of Classification Search
CPC .............. B60R 9/00; B60R 9/10; B60R 11/06
USPC ............... 224/404, 402, 403, 540, 545, 548; 296/37.6
See application file for complete search history.

(56) References Cited

U.S. PATENT DOCUMENTS

| | | | | |
|---|---|---|---|---|
| 1,452,789 A | * | 4/1923 | Carek | B60C 23/16 220/562 |
| 2,261,915 A | | 11/1941 | Korte | |
| 3,294,025 A | * | 12/1966 | Niemeyer | F04D 29/606 210/416.4 |
| 3,396,983 A | * | 8/1968 | Massey | B62D 49/06 239/142 |
| 3,586,363 A | * | 6/1971 | Omlid | B60K 15/00 137/575 |
| 3,586,883 A | * | 6/1971 | Hayes | H03K 17/6871 327/387 |
| 3,664,704 A | | 5/1972 | Ellis | |

(Continued)

*Primary Examiner* — Adam Waggenspack
*Assistant Examiner* — Lester L Vanterpool
(74) *Attorney, Agent, or Firm* — Schmeiser, Olsen & Watts LLP (57) ABSTRACT

An over the wheel well liquid storage tank for storing liquid in a bed of a truck includes a tank body having a main tank portion shaped to fit in an area adjacent a wheel well in the bed of a truck and an over a wheel well tank portion shaped to fit in an area above a wheel well in the bed of a truck. The main tank portion is shaped to fit in an area adjacent a proximal side of the wheel well or in an area adjacent a distal side of the wheel well. A mounting system is coupled to the tank body. The mounting system couples the tank body to the bed of a truck. The mounting system includes a channel coupled to the tank body and a mounting bracket for coupling to the channel and to the truck. The mounting system includes an adjustable bumper.

17 Claims, 12 Drawing Sheets

(56) References Cited

U.S. PATENT DOCUMENTS

| | | | | |
|---|---|---|---|---|
| 3,727,971 A * | 4/1973 | Sisler | ............. | B60K 15/073 224/404 |
| 3,854,621 A | 12/1974 | Parry | | |
| D279,664 S * | 7/1985 | Waters, Jr. | ............. | D12/423 |
| 4,660,880 A | 4/1987 | Bensch | | |
| 4,829,968 A * | 5/1989 | Onufer | ............. | B60K 15/03504 123/518 |
| 5,133,484 A * | 7/1992 | Globert | ............. | B67D 7/58 137/590 |
| 5,133,848 A | 7/1992 | Globert | | |
| 5,535,931 A * | 7/1996 | Barlow | ............. | B60R 7/02 224/403 |
| 5,848,818 A * | 12/1998 | Flueckinger | ............. | B60R 9/00 296/100.02 |
| 6,039,203 A * | 3/2000 | McDaniel | ............. | B60K 15/03006 220/562 |
| 6,079,741 A * | 6/2000 | Maver | ............. | B60R 9/00 224/404 |
| 6,824,184 B2 | 11/2004 | Leitner et al. | | |
| 6,886,876 B1 * | 5/2005 | Damian | ............. | B60R 9/00 224/404 |
| 7,182,177 B1 * | 2/2007 | Simnacher | ............. | B66F 3/12 187/211 |
| 2006/0076379 A1 * | 4/2006 | Hussaini | ............. | B60R 7/043 224/275 |
| 2008/0308591 A1 * | 12/2008 | Henderson | ............. | B60R 5/00 224/404 |
| 2009/0200350 A1 * | 8/2009 | Brallier | ............. | B60R 9/00 224/404 |
| 2009/0200351 A1 * | 8/2009 | Brallier | ............. | B60R 9/00 224/404 |
| 2014/0042160 A1 * | 2/2014 | Anderson | ............. | B60K 15/03177 220/4.14 |

* cited by examiner

OVER THE WHEEL WELL LIQUID STORAGE TANK

This application claims priority to U.S. patent application entitled "OVER THE WHEEL WELL LIQUID STORAGE TANK," Ser. No. 14/514,235, filed Oct. 14, 2014, the disclosure of which is hereby incorporated entirely herein by reference.

BACKGROUND OF THE INVENTION

1. Technical Field

This invention relates to a tank for storing liquid that is mounted in the bed of a truck adjacent to and over the wheel well.

2. Background Art

Truck owners often have need for portable liquid storage such as storage for extra fuel or water, and the like. Whether the owner needs extra fuel for the truck itself, water for drinking, or the like, having a way to store liquid in the bed of a truck is very convenient.

However, finding space for a liquid storage tank in the bed of a truck can often be tricky. Truck owners often use the bed of their trucks to move large items, to move their recreational vehicles, or the like. Therefore, mounting a large tank in the bed of a vehicle is often not practical.

Further, a loose tank in the bed of a truck can tip and spill or fall out of the truck bed. Therefore, having the tank mounted in the truck bed is often desirable.

There is space in a bed of a truck that is often unusable because of its strange shape. This space is located adjacent to and above the wheel wells which extend into the bed of a truck. Items placed in the bed of the truck are usually not placed in this space because of its restricted nature. Therefore, this space often goes unused and would be a desirable location to mount a liquid storage tank.

Over the years a few fuel or liquid storage devices have been designed for placement adjacent to the wheel well in the bed of a truck, i.e. U.S. Pat. No. 3,586,883 issued to Omlid and U.S. Pat. No. 3,727,971 issued to Sisler. These devices, however, fail to utilize the area over the wheel well for fuel or liquid storage. Sisler shows storage over the wheel well, this storage is not, however, used for fuel or liquids. Therefore, these devices fail to maximize the amount of fuel or liquid stored.

Accordingly, what is needed is an over the wheel well liquid storage tank that fits in the limited space located adjacent to and above the wheel well in the bed of a truck maximizing the amount of liquid stored and utilizing as much of the awkward space in this location as possible.

DISCLOSURE OF THE INVENTION

The over the wheel well liquid storage tank, as disclosed hereafter in this application, is configured to utilize the typically unused space above the wheel well in the bed of a truck.

In particular embodiments, a liquid storage tank for storing liquids in a bed of a truck includes a tank body. The tank body having a main tank section shaped to fit a location adjacent a wheel well in the bed of a truck and an over the wheel well tank section shaped to fit a location above the wheel well in the bed of a truck. The over the wheel well tank section is in fluid communication with the main tank section and liquids may be stored in the main tank section and the over the wheel well tank section. A liquid fill opening is also coupled to the tank body.

An alternate embodiment of a liquid storage tank for storing liquids in a bed of a truck includes a tank body shaped to fit adjacent to and above a wheel well in the bed of a truck. A liquid fill opening coupled to the tank body. A mounting system coupled to the tank body and to the truck. The mounting system includes: at least one channel coupled to the tank body; at least one mounting bracket for coupling to the at least one channel and to the truck; and at least one adjustable bumper for supporting the tank body above the wheel well in the bed of a truck.

Additional embodiments of a liquid storage tank for storing liquids in a bed of a truck may include a tank body having a main tank portion shaped to fit in an area adjacent a wheel well in the bed of a truck and an over a wheel well tank portion shaped to fit in an area above the wheel well in the bed of a truck. The main tank portion is shaped to fit in an area adjacent a proximal side of the wheel well or in an area adjacent a distal side of the wheel well. A mounting system coupled to the tank body which couples the tank body to the bed of a truck.

Embodiments of a liquid storage tank and truck combination may include a truck having a bed. A wheel well located in the bed of the truck. A tank body coupled in the bed of the truck. The tank body having a main tank section shaped to fit a location adjacent a wheel well in the bed of the truck. The tank body further including an over the wheel well tank section shaped to fit a location above a top of the wheel well in the bed of the truck, wherein the over the wheel well tank section is in fluid communication with the main tank section. A liquid fill opening may be coupled to the tank body, wherein liquid is stored in the main tank section and the over the wheel well tank section.

Additional embodiments of a liquid storage tank and truck combination may include a truck having a bed and a cab. The bed having a front of the bed adjacent the cab and a wall of the bed perpendicular the front of the bed. A wheel well located adjacent the wall of the bed of the truck. A tank body shaped to fit adjacent to and above a top of the wheel well in the bed of the truck. A liquid fill opening coupled to the tank body. A mounting system coupled to the tank body and to the truck. The mounting system including at least one channel coupled to the tank body and at least one mounting bracket for coupling to the at least one channel and to the wall of the bed of the truck. At least one adjustable bumper for supporting the tank body above the wheel well in the bed of the truck.

Alternate embodiments of a liquid storage tank and truck combination including a truck and a bed on the truck, wherein the bed has a wall and a floor. A wheel well located in the bed of the truck. A tank body having a main tank portion shaped to fit in an area adjacent the wheel well in the bed of the truck and an over the wheel well tank portion shaped to fit above a top of the wheel well in the bed of the truck, wherein the main tank portion is shaped to fit in an area adjacent a proximal side of the wheel well or in an area adjacent a distal side of the wheel well. A mounting system coupled to the tank body, wherein the mounting system couples the tank body to the floor and the wall of the bed of the truck with the main tank portion in an area adjacent the proximal side of the wheel well or in an area adjacent the distal side of the wheel well. A liquid fill opening coupled to the tank body.

The foregoing and other features and advantages of the over the wheel well liquid storage tank will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

As discussed above, embodiments of the present invention relate to a liquid storage tank which is mounted adjacent to and above the wheel well in the bed of a truck. In particular, disclosed is a tank body and mounting system that allows the user to utilize the often unused space adjacent to and above the wheel well in the bed of a truck for liquid storage. Liquids stored may include different types of fuel, potable and non-potable liquids and the like.

Figure 1:
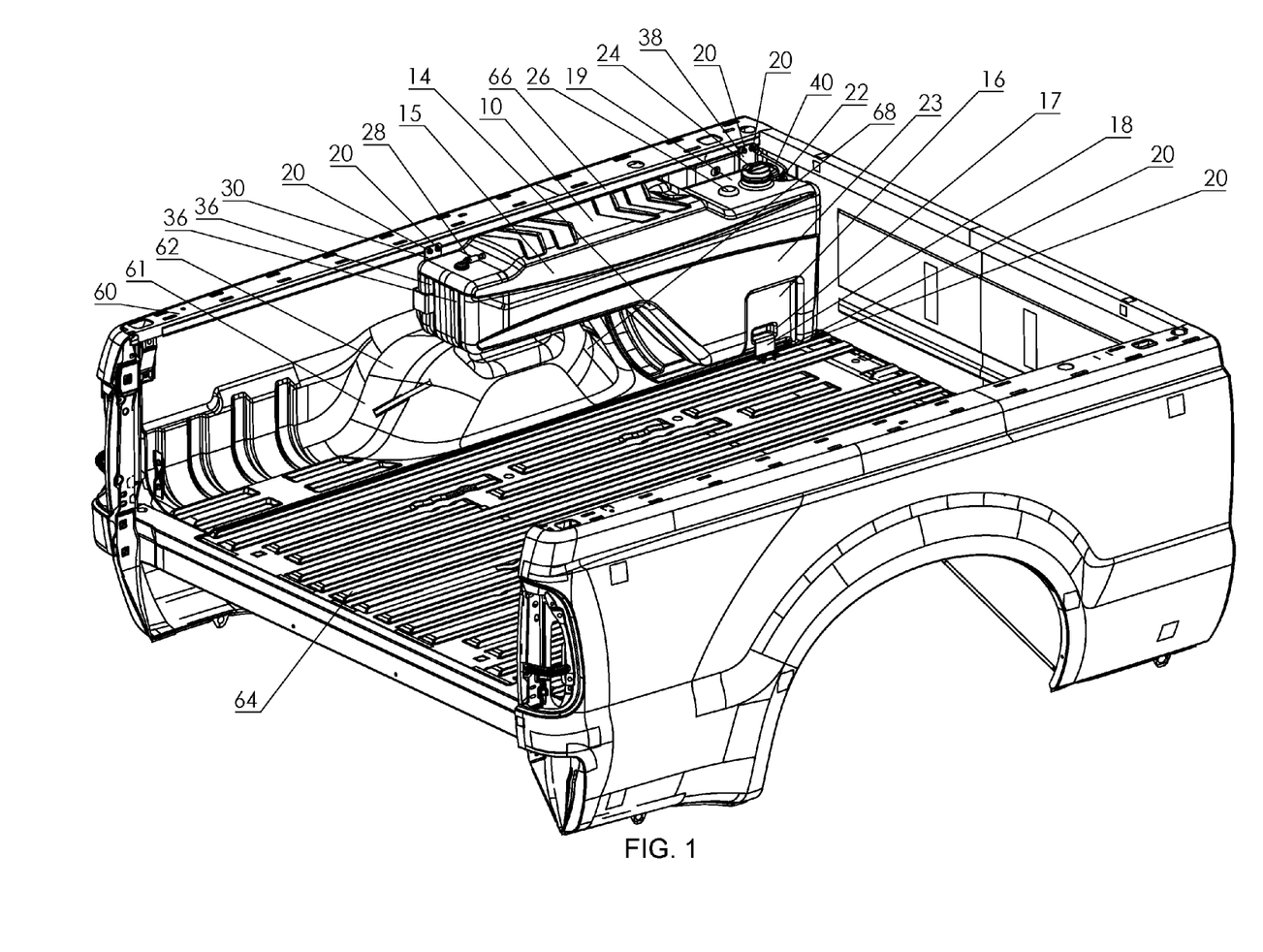
FIG. 1 is an isometric view of an over the wheel well liquid storage tank mounted in the bed of a truck.
Figure 2:
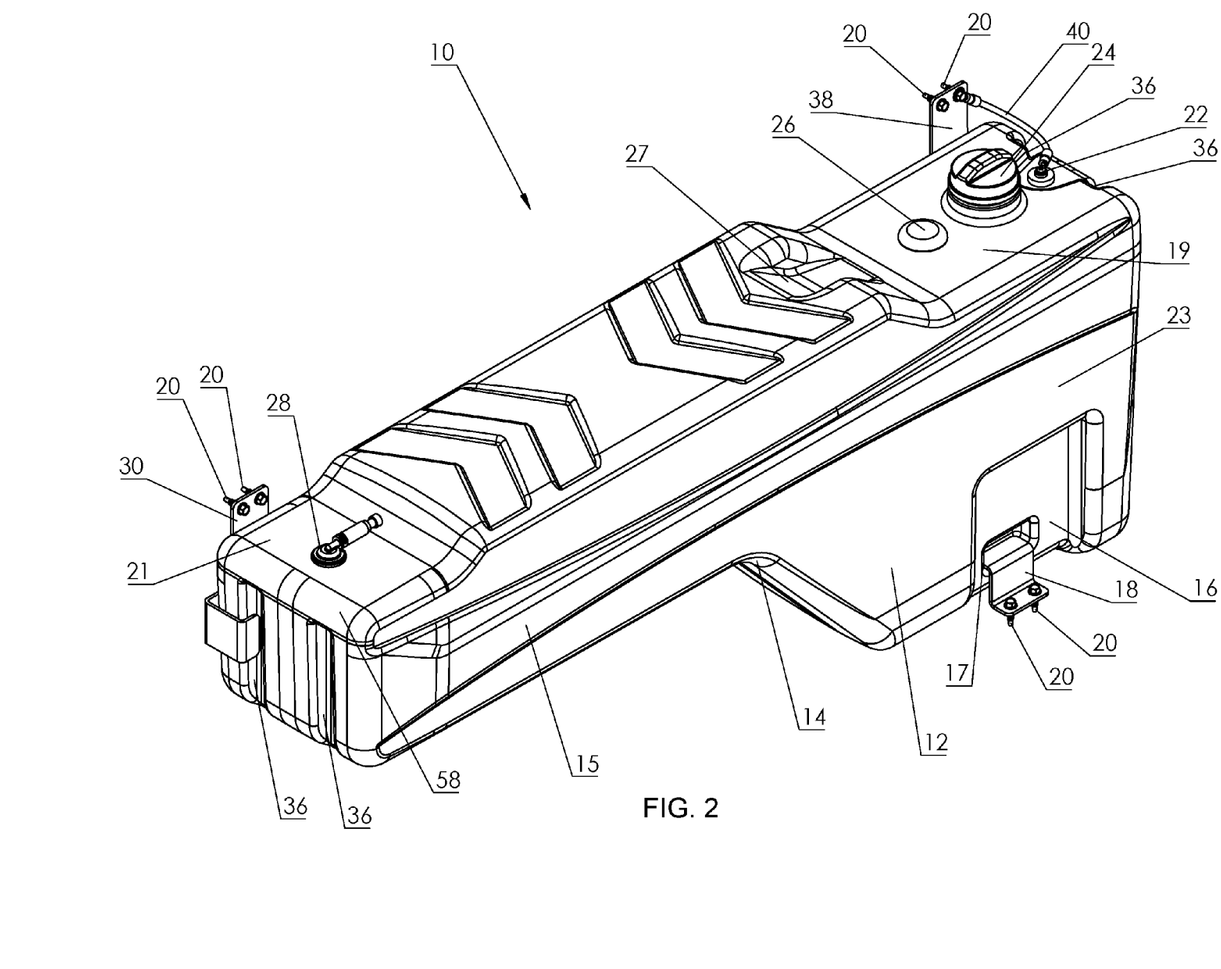
FIG. 2 is an isometric view of an over the wheel well liquid storage tank.

FIG. 1 illustrates an over the wheel well tank 10 mounted in the bed 60 of a truck. The bed 60 of the truck comprises a wheel well 62 which is an arch shaped bump in the bed 60 of the truck. The wheel well 62 is formed by the area surrounding the wheels underneath the truck extending up into the bed 60 itself. The wheel well 62 has a distal side 61 which is located towards the back of the truck. The wheel well 62 also has a proximal side 68 which is located towards the front or cab of the truck. The truck bed 60 further comprises a bed floor 64 which is the bottom of the truck bed 60. A bed wall 66 is the side of the truck bed 60 and extends from the bed floor 64 upward.

FIGS. 1-8 illustrate an over the wheel well tank 10 comprising a tank body 12. The tank body 12 is used to store the liquid. The tank body 12 may be formed from any material desirable. In particular, the tank body 12 may be formed high density cross-linked polyethylene which is strong and durable, but also light weight and inexpensive to manufacture. The tank body 12 may also be formed from other plastics, nylon, metals and the like. The tank body 12 comprises two sections which are typically formed as one unit. The tank body 12 includes a main body section 23. The main body section 23 is sized and shaped to fit in an area adjacent the wheel well 62 in the bed 60 of the truck. In this case, adjacent means a location next to, but not necessarily touching the wheel well 62. The main body section 23 is sized and shaped to fit adjacent a distal side 61 of a wheel well 62. The distal side 61 of the wheel well 62 is the area of the bed 60 of the truck 60 which is between the wheel well 62 and the back of the truck bed 60 where the tail gate would be located. The main body section 23 is also sized and shaped to fit adjacent a proximal side 68 of the wheel well 62 in the bed 60 of the truck. The area adjacent the proximal side 68 of the wheel well 62 in the bed 60 of the truck is the area between the wheel well 62 and the cab of the truck. By shaping the main body section 23 of the over the wheel well liquid storage tank 10 to fit on either side of the wheel well 62, the over the wheel well liquid storage tank 10 is reversible and can be mounted with the main body section 23 of the over the wheel well liquid storage tank 10 towards the front or the back of the truck.

Tank body 12 has an approximately rectangular cross section, this cross section, however, shortens as the length of the tank body 12 is traveled. The main body section 23 of the tank body 12 has an approximately square face. The side of the main body section 23, however, that is adjacent the wheel well 62, may be formed at an angle in order to maximize the use of the space adjacent the wheel well 62 and thereby maximize the amount of liquid that may be stored.

The main body section 23 of the tank body 12 may be formed in any size or shape desirable. However, in some embodiments, the main body section 23 be shaped so as to utilize as much of the area adjacent the wheel well 62 as possible in order to maximize the amount of liquid that may be stored.

The main body section 23 of the tank body 12 is in fluid communication with the over the wheel well section 15 of the tank body 12. The over the wheel well section 15 of the tank body 12 is located over the wheel well 62 in the bed 60 of the truck. The over the wheel well section 15 is a long rectangular section with a rectangular cross section. The over the wheel well section 15 has a top and bottom that run parallel to each other. The over the wheel well section 15 is coupled to the main body section 23 at a location where the bottom of the over the wheel well section 15 and the side of the main body section 23, which is adjacent the wheel well 62, form an angle 14. Angle 14 may be any angle desirable. In particular, it may be an angle 14 that maximizes the amount of liquid storage. The angle 14 should also, however, be an angle that allows the over the wheel well liquid storage tank 10 to be mounted in a variety of different makes and models of truck.

In this case, angle 14 is likely somewhere around 132.5° or likely falls in a range between 100° and 150°. This angle 14, however, may change as the designs of trucks evolve.

The over the wheel well section 15 of the tank body 12 may be formed in any shape desired. In some embodiments, the over the wheel well section 15 of the tank body 12 will be formed to maximize the area between the top of the wheel well 62 and the top of the wall of the truck bed 66. The over the wheel well section 15 should be formed to maximize the space available while allowing the tank body 12 to fit in multiple makes and models of vehicles. Therefore, depending on the make and model off the truck, the over the wheel well section 15 may or may not abut the top of the wheel well 62. This is true also of the main body section 23 of the tank 10. The main body section 23 may or may not abut the side of the wheel well 62 depending on the make and model of the truck the tank 12 is placed in.

Indentations may also be formed in the tank body 12. These indentations may be used for mounting or for accommodating accessories which may be installed in the truck bed 60 i.e., tie down indentation 16 which is an indentation formed in the side of the tank body 12 towards the bottom of the main section 23 of the tank body 12. The tie down indentation 16 may be centered or located slightly off centered on the main section 23 of the tank body 12. The tie down indentation 26 allows space for tie downs which may be existing in the truck bed 60 or which the user may add after the tank 10 is installed in the vehicle. Other accessories may also utilize the tie down indentation 16.

The tie down indentation 16 may be formed in any size, shape or depth desired.

Other indentations may also be located in the tank body 12 in order to allow space for other accessories that may be located in the bed 60 of the truck.

Figure 9:
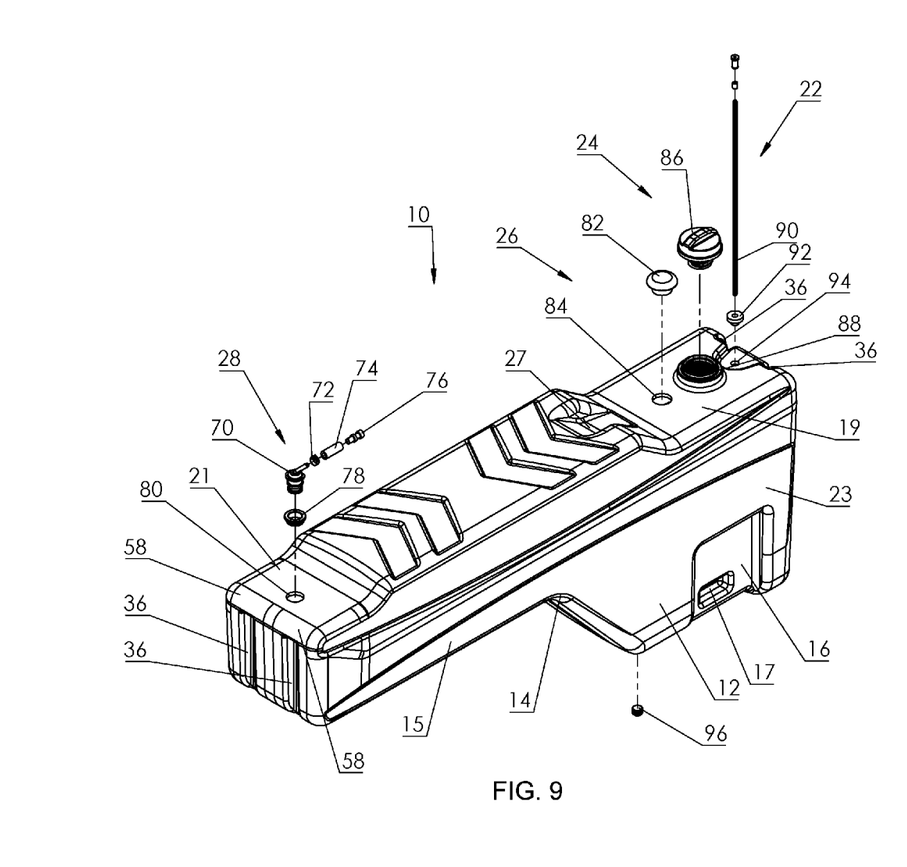
FIG. 9 is an exploded view of an over the wheel well liquid storage tank.

The tank body 12 also comprises openings which are used for various devices or the like which need access to the inside of the tank body 12. As shown in FIG. 9, the liquid fill opening system 24 is located in the top of the main body section 23 of the tank body 12. An exploded view of the liquid fill opening system 24 is illustrated in FIG. 9. The liquid fill opening system 24 consists of a liquid fill opening 88. The liquid fill opening 88 is an opening that allows liquid to be put in the tank. The liquid fill opening 88 may be a round threaded opening with a cap 86 that threads into it to close the liquid fill opening 88. The liquid fill opening 88 may also be an insert such as a threaded neck which may be placed in an opening in the tank body 12 with a cap 86 that may be attached by screwing it into the threads. The liquid fill opening 88 may be any size or shape desired. It may also be placed in any location on the tank 10 desired. The liquid fill opening 88 may be molded into the tank body 12 or else it may be attached to the tank body 12, inserted into the tank body 12 or the like.

The cap 86 for the liquid fill opening system 24 may be any type of cap that seals the liquid fill opening 88. The cap 86 may be threaded to screw onto the threads in the liquid fill opening 88 or it may be compression fit or the like. The cap 86 may also have a thin plastic strip or leash that couples the cap to the tank 10 or the liquid fill opening 88 so that the cap 86 does not get lost while it is not attached to the liquid fill opening 88.

A pump location 26 may also be formed or located in the tank body 12. In FIG. 9, the pump location 26 includes a pump opening 84 in the top of the tank 10 which may be plugged with a plug 82 as shown in FIGS. 1-8. The pump location 26 comprises a pump opening 84 in which a hand pump or electric pump may be placed in order to remove the liquid in the tank 10. The pump opening 84 may also receive a siphon or the like. The pump location 26 may be any size or shape desired and may be located anywhere on the tank body 12.

An additional opening shown in the top of the tank body 12 holds the grounding stud system 22. This grounding stud opening system 22 includes a grounding stud 90 as illustrated in the exploded view in FIG. 9. The grounding stud 90 acts to ground any static electricity which may exist in the tank body 12. The grounding stud 90 is a metal rod which is inserted into the tank body 12 to attract any electric charge that might form inside.

The grounding stud 90 is inserted through a grommet 92 and then the grommet 92 and the grounding stud 90 are inserted into the grounding stud opening 94.

The grommet 92 is simply a rubber grommet that is designed to form a tight seal between the grounding stud 90 and the grounding stud opening 94.

The grounding stud opening 94 is a hole formed, cut or inserted in the top of the tank body 12. Though, the grounding stud opening 94 may be any size or shape and may be located anywhere on the tank body 12 desired.

The grounding stud 90 is coupled to grounding wire 40. Grounding wire 40 is then coupled to metal on the truck. The grounding wire 40 provides a path for any electric charge accumulated by the grounding stud 90. The electricity travels through the grounding stud 90, through the grounding wire 40 and is dissipated into the truck body. The grounding wire 40 may be any type of wire that conducts electricity.

Another opening in the tank body 12 may be located in the over the wheel well section 15 of the tank body 12. This opening is part of the vent system 28 for the tank 10. The vent system 28 includes a vent opening 80 which is formed, cut or inserted into the tank body 12. The vent opening 80 is illustrated as a small round hole in the tank body 12, however, the vent opening 80 may be any size or shape desired. A grommet 78 is then placed in the vent opening 80 the grommet 78 serves to create a compression fitting with the other members of the vent system 28. The grommet 78 may be formed from any material and may be any size or shape desired.

The grommet 78 holds the roll over vent valve 70 in the vent opening 80. The roll over vent valve 70 is a valve that allows fumes to vent from the tank 10. However, if the truck the tank 10 is in rolls over, the valve 70 would close preventing liquid from leaking out of the tank 10. The roll over vent valve 70 couples to a vent tube 74 with a hose clamp 72. The other end of the vent tube 74 is coupled to a vent cap 76. The vent cap 76 is designed to prevent dirt and other debris from entering the tank 10 through the vent system 28.

The top of the tank body 12 may comprise multiple elevations. For example, lower elevations 19 and 21 which are indentations in the top of the tank body 12 prevent the liquid fill opening system 24, the grounding stud system 22, the pump location 26 and the vent system 28 from rising above the top of the bed wall 66 of the truck bed 60. This prevents the components of these systems from being damaged by things being put in the bed 60 of the truck or by debris or the like which may blow by the truck when it is driving.

The higher elevation between lower elevations 19 and 21 provides maximum liquid storage capacity to the tank 10.

Figure 6:
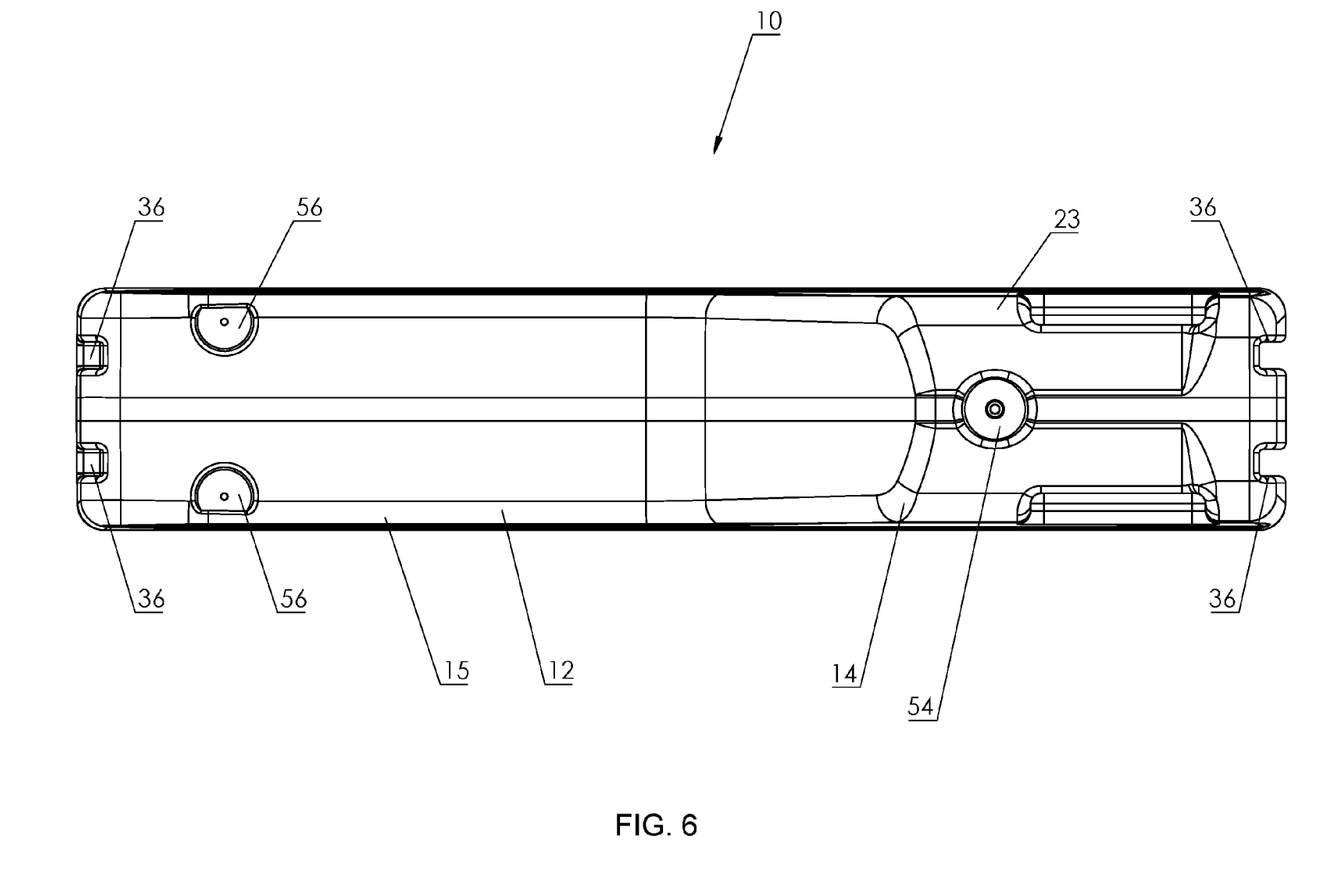
FIG. 6 is a bottom view of an over the wheel well liquid storage tank.
Figure 7:
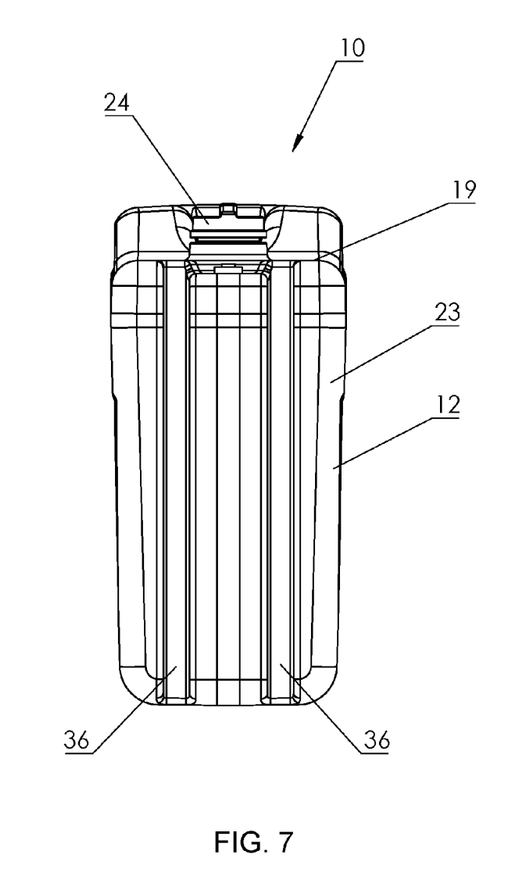
FIG. 7 is a first end view of an over the wheel well liquid storage tank.

FIG. 6 illustrates the bottom of the tank body 12. Drain 54 is located in the bottom of the main body section 23 of the tank body 12. Drain 54 as illustrated in the figures is an opening formed cut or inserted into the bottom of the tank body 12. Drain 54 is illustrated in FIG. 6 with a plug inserted in the opening. This plug 96 (see FIG. 9) may be removed from drain 54 in order to drain liquid that has gone bad or become polluted. This is particularly useful in situations where dirt or other debris has entered the liquid. Dirt and debris could potentially clog a pump and therefore draining the debris from the bottom of the tank is more practical.

In alternate embodiments, drain 54 could be used to connect to the existing fuel system of a vehicle. Tubes could be used to connect drain 54 to the fuel tank on the truck. Gravity could be used to force the fuel from the over the wheel well tank 10 into the main fuel tank of the vehicle as the fuel tank of the vehicle is depleted.

Plug 96 may be any type of plug such as a rubber stopper that prevents the liquid in the tank 10 from draining out the drain 54.

Figure 10:
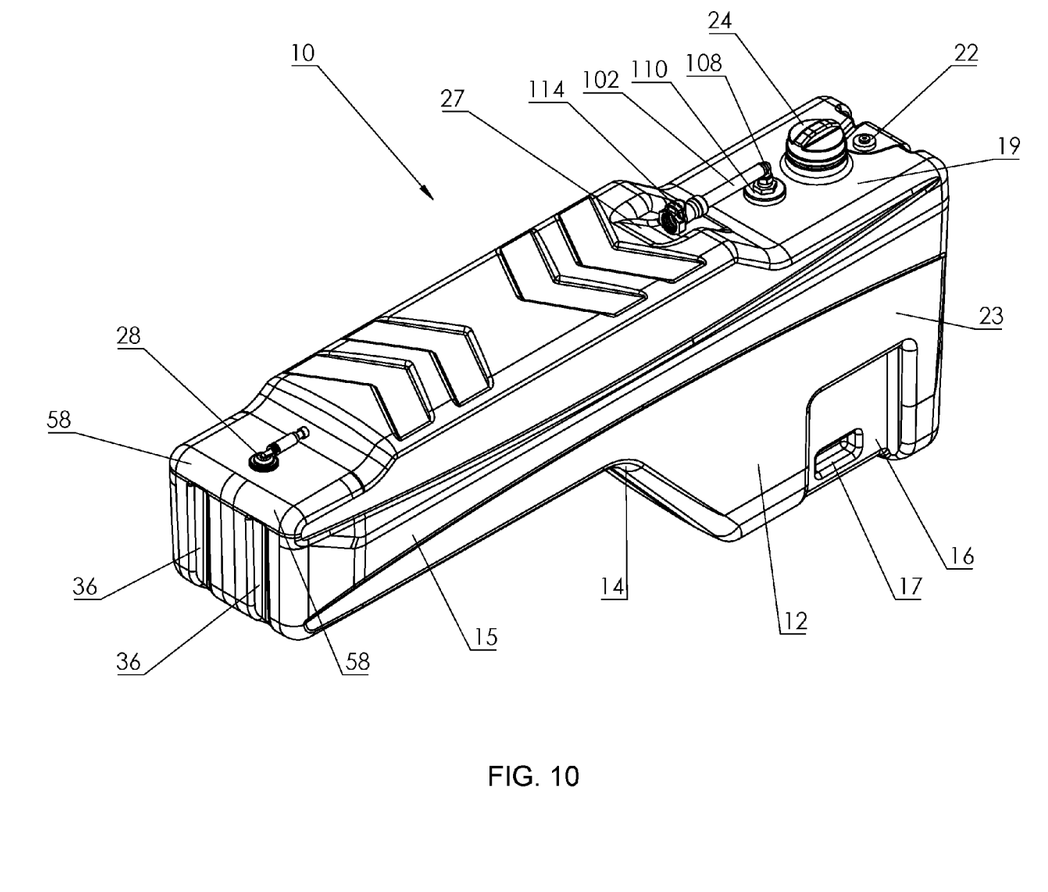
FIG. 10 is an isometric view of an alternate embodiment of an over the wheel well liquid storage tank.
Figure 11:
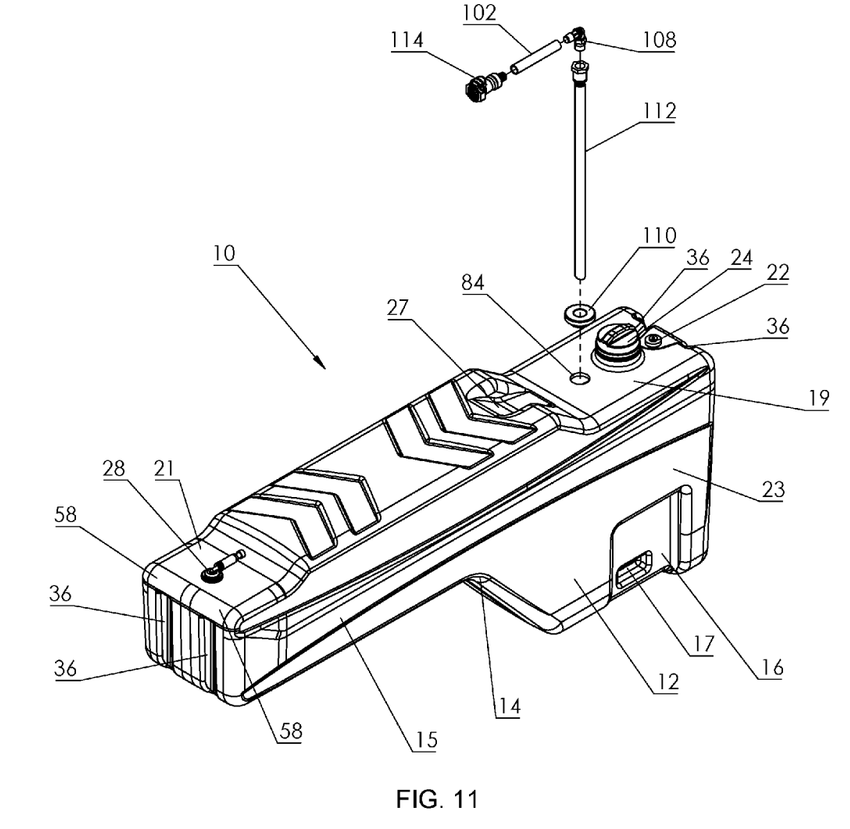
FIG. 11 is an exploded view of the alternate embodiment of an over the wheel well liquid storage tank of FIG. 10.

FIGS. 10-11 illustrate a tank 10 configured with a quick connection for attaching a pump to the over the wheel well tank 10. The quick connection consists of a pipe 112 which is inserted into the tank body 12 through the pump opening 84. The pipe 112 extends into the tank body 12 to the lowest portion of the main tank section 23 in order to allow a pump or other device attached to the quick connection to pull as much liquid as possible out of the tank 10. The pipe 112 is held in place in the pump opening 84 by a grommet 110. Grommet 110 is a rubber ring with a lip around the end. The pipe 112 is inserted snuggly into the grommet 110 and then the pipe 112 and the grommet 110 are inserted into the pump opening 84. The grommet 110 creates a compression fit which makes the interface water tight.

The pipe 112 is then coupled to an elbow 108. The elbow 108 illustrated is a 90° bend, however, other angles may also be utilized.

The elbow 108 couples through a tube 102 to a quick connect 114. The quick connect 114 is a valve which is in the closed position until a connector is coupled into the quick connect 114. When a connector is coupled to the quick connect 114 then the valve is opened. This quick connect 114 configuration allows a hand pump, motorized pump or other suction device to be easily snapped or coupled into the tank 10 so that liquid may be removed.

A connector indent 27 is formed in the top of the tank body 12 into which the quick connect 114 is placed. The connector indent 27 is simply a small indentation in the top of the tank body 12 which is big enough to contain the quick connect 114. The connector indent 27 protects the quick connect 114 from damage.

Figure 12:
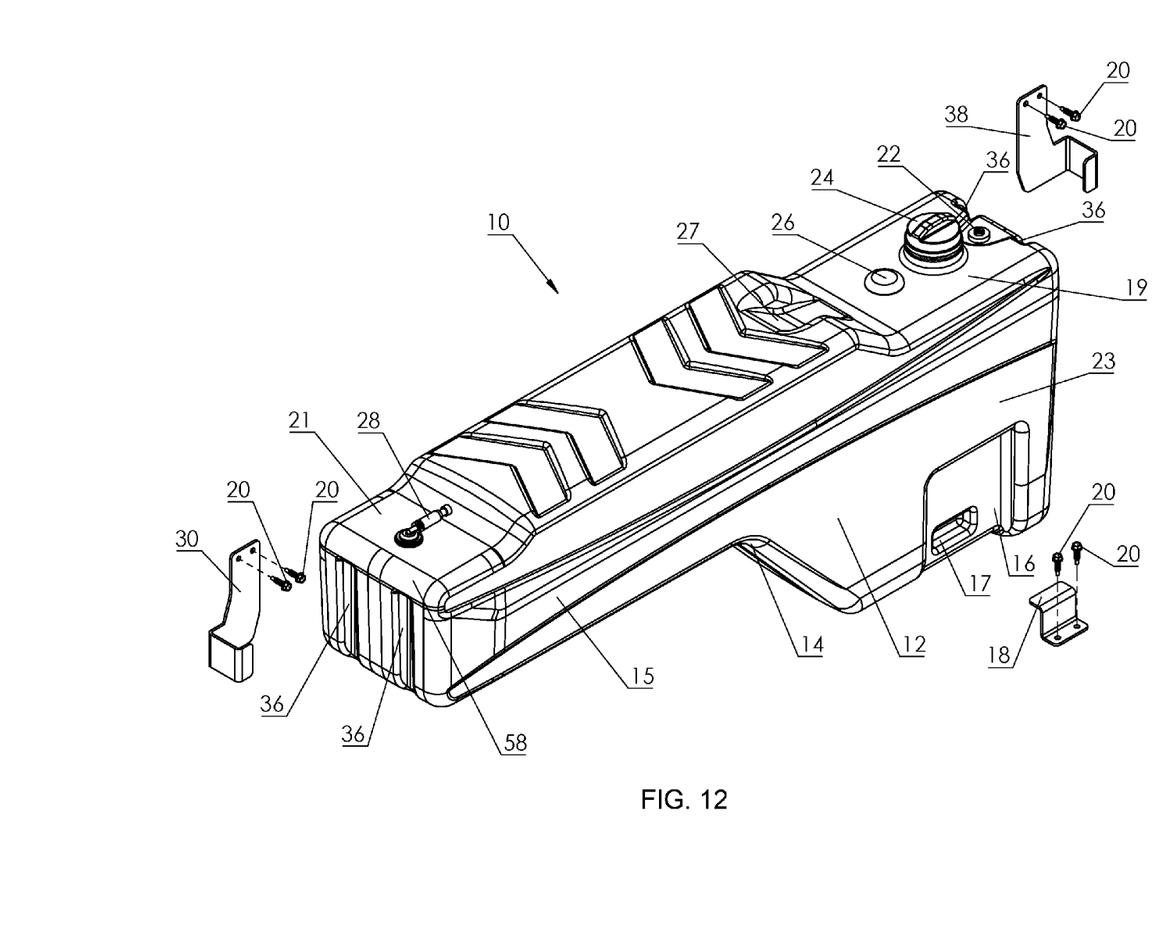
FIG. 12 is an exploded view of a mounting system for mounting an over the wheel well tank into the bed of a truck.

The tank body 12 is mounted to a truck bed through a mounting system. FIG. 12 is a view of the over the wheel well tank 10 with the mounting system exploded.

An angle iron indent 17 is located within the tie down indentation 16 on the tank body 12. The angle iron indent 17 is a smaller indentation that extends farther into the tank body 12 than the tie down indentation 16.

The angle iron indent 17 may, however, be any size or shape desired and may be any depth desired.

An angle iron 18 is part of the mounting system used to mount the tank 10 to the truck bed 60. The angle iron 18 is typically a small metal piece that has a cross section similar to a Z. In other words, the angle iron 18 has a horizontal member coupled by a 90° angle to a perpendicular member which is also coupled by a 90° angle to an additional horizontal member.

FIGS. 1-8 illustrate the angle iron 18 mating with the angle iron indent 17 in order to mount the tank body 12 to the truck bed 60. The angle iron 18 has holes in one of the horizontal members. These holes receive screws 20 which couple the angle iron 18 to the truck bed 60. The force applied by the angle iron 18 on the angle iron indent 17, when the angle iron 18 is mounted to the truck bed 60, aids in holding the tank body 12 in position in the truck bed 60.

Screws 20 are used to mount the angle iron 18 and other members of the mounting system to the truck bed 60. Screw 20 may be sheet metal screws, wood screw, bolts with washers and nuts, adhesive or any other type of coupler or connector which could secure the angle iron 18 and other mounting system members to the truck bed 60.

Mounting channels 36 are illustrated in both ends of the tank body 12. At least one mounting channels 36 extend from the top to the bottom of a first end of the tank body 12 (see FIG. 7). The first end of the tank body 12 is the outside edge of the main tank section 23 of the tank body 12. The figures illustrate two mounting channels 36 running along the end of the tank body 12. One of these channels runs near the front of the tank body 12 and the other runs near the back of the tank body 12.

The mounting channels 36 are long narrow indentations in the tank body 12 which run vertically from the top to the bottom of the tank body 12.

Figure 8:
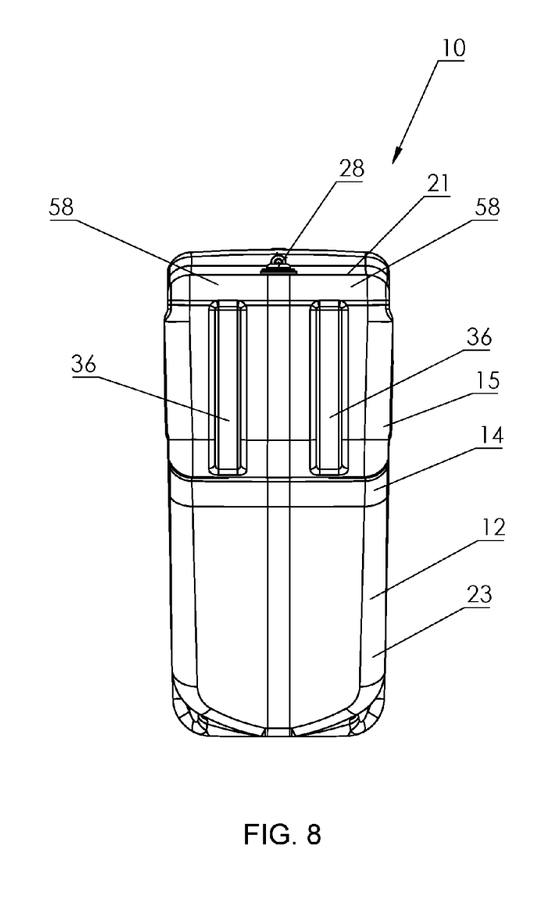
FIG. 8 is a second end view of an over the wheel well liquid storage tank.

A second end of the tank body 12 also has at least one mounting channel 36 running from the top to the bottom of the over the wheel well section 15 of the tank body 12 (see FIG. 8). The mounting channels 36 (two are illustrated) on this end of the tank body 12 do not extend all of the way to the top of the tank body 12. Instead, the mounting channels 36 end at channel stops 58 at the top of each of the channels 36. These channel stops 58 are intended to prevent the mounting system from sliding out the top of the channels 36 at this end. Channel stops 58 are simply an end to the channel 36 or a portion of tank body which extends across the end of the channel 36 in order to cap the channel 36.

Though no mounting stops 58 are illustrated on the first end of the tank body 12, mounting stops 58 could be included on that end also.

FIG. 12 illustrates an exploded view of many of the other pieces in the mounting system. Mounting brackets 30 and 38 couple to the mounting channels 36 in the ends of the tank body 12. Mounting brackets 30 and 38 are mirror images of each other and therefore their shape will be discussed together. Each of the mounting brackets has a flat member which runs parallel to the tank body 12 and parallel to the bed wall 66 on the truck. These flat members have holes formed in them so that screws 20 may be inserted through the holes and into the bed wall 66. These flat members are coupled at a 90° angle with a smaller member, which also has a 90° angle formed in it. This smaller member wraps around the edge of the tank body 12 and into the mounting channel 36. When the mounting brackets 30 and 38 are placed snug against the ends of the tank body 12 with the mounting brackets 30 and 38 inserted into the mounting channels 36, the mounting brackets 30 and 38 are then coupled to the bed wall 66.

The horizontal force from the mounting brackets 30 and 38 keep the tank body 12 in place. Additionally, the mounting brackets 30 may be located anywhere along the length of the mounting channels 36. This allows the over the wheel well tank 10 to be mounted in many different makes and models of vehicles without having to have a different tank body 12 or different mounting system for each.

The channel stops 58 prevent the mounting bracket 30 from sliding out of the channel 36. The channel stops 58 would also allow the tank body 12 to be mounted using only the mounting bracket 30 at the second end of the tank body 12.

Figure 3:
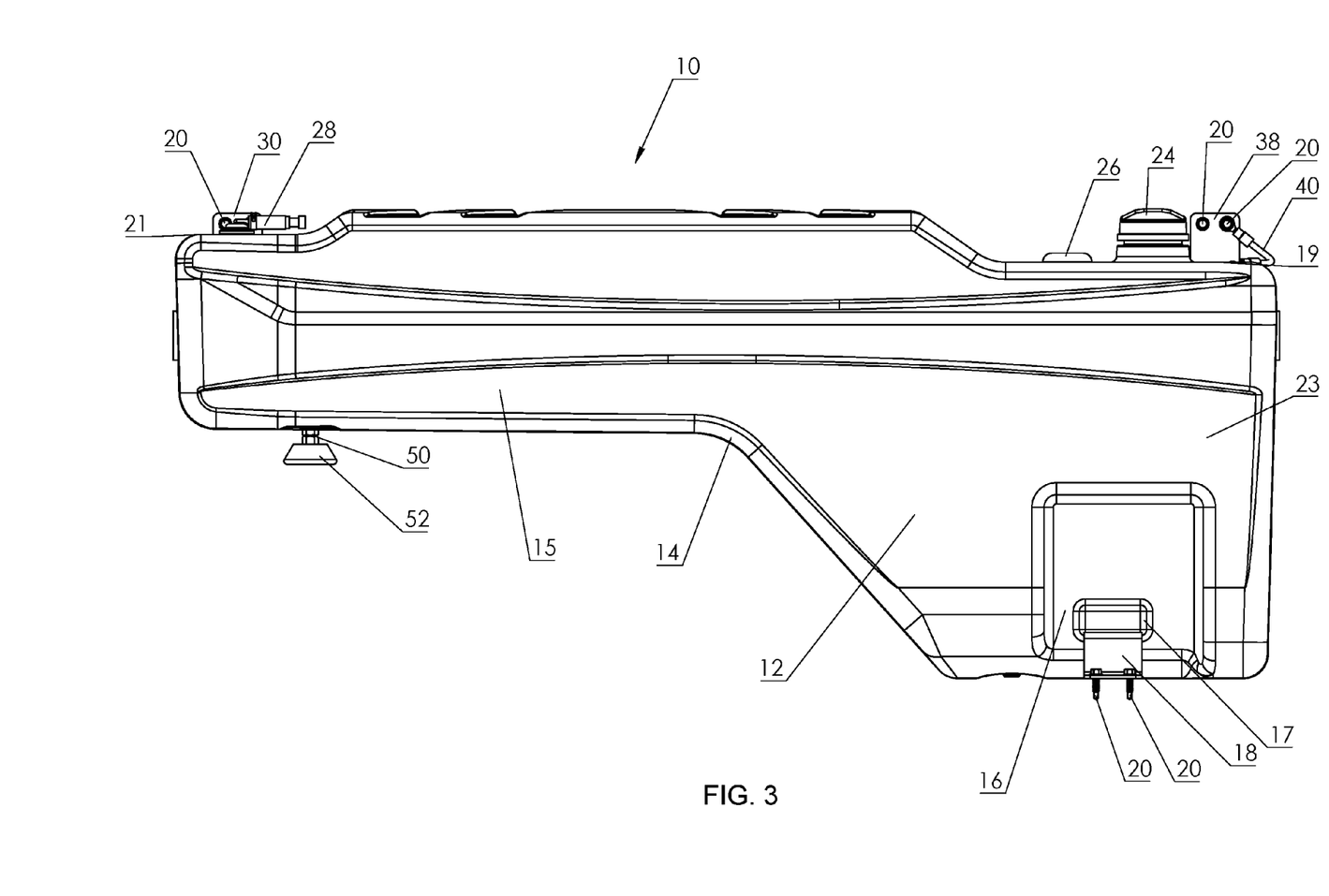
FIG. 3 is a first side view of an over the wheel well liquid storage tank.
Figure 4:
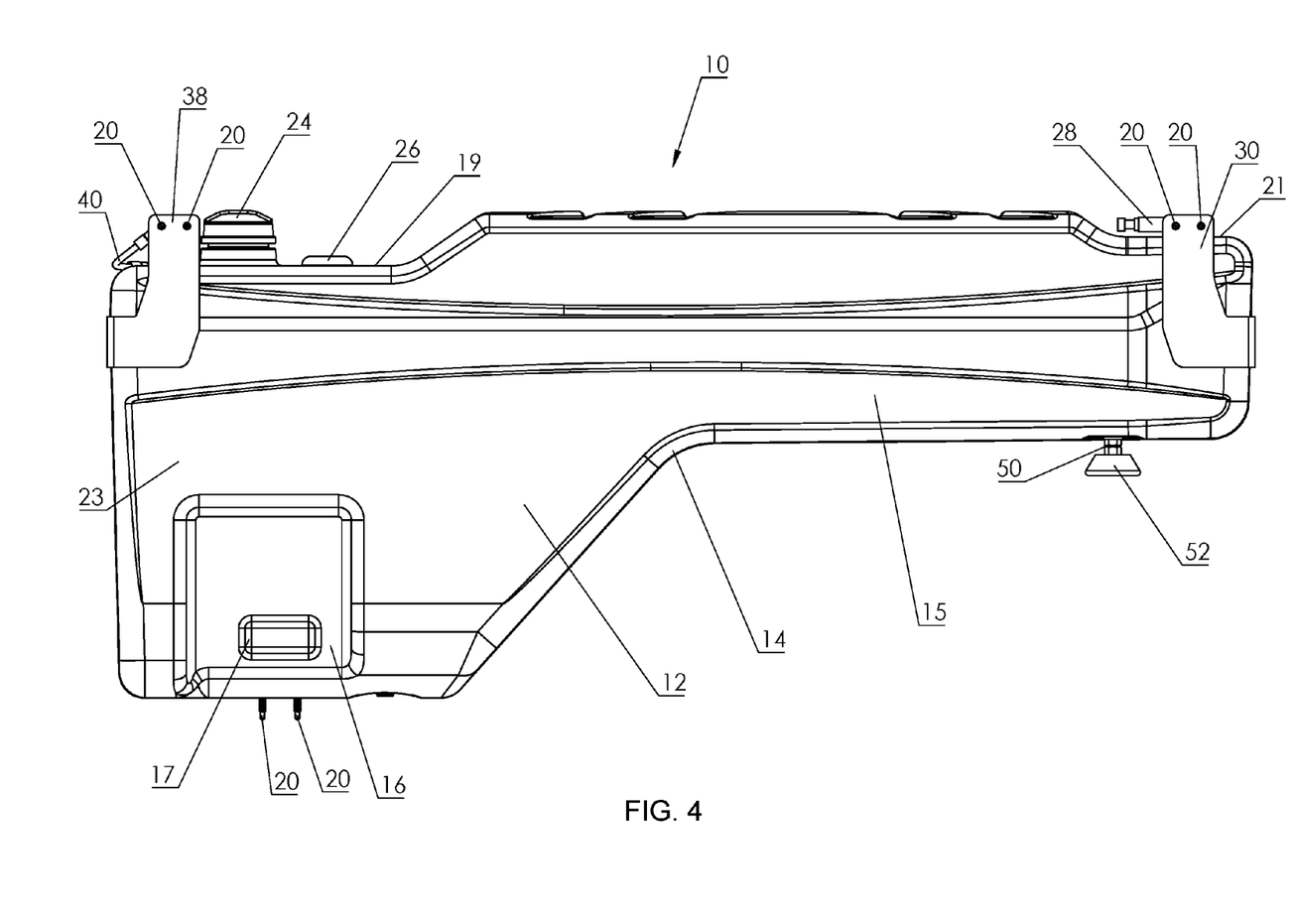
FIG. 4 is a second side view of an over the wheel well liquid storage tank.
Figure 5:
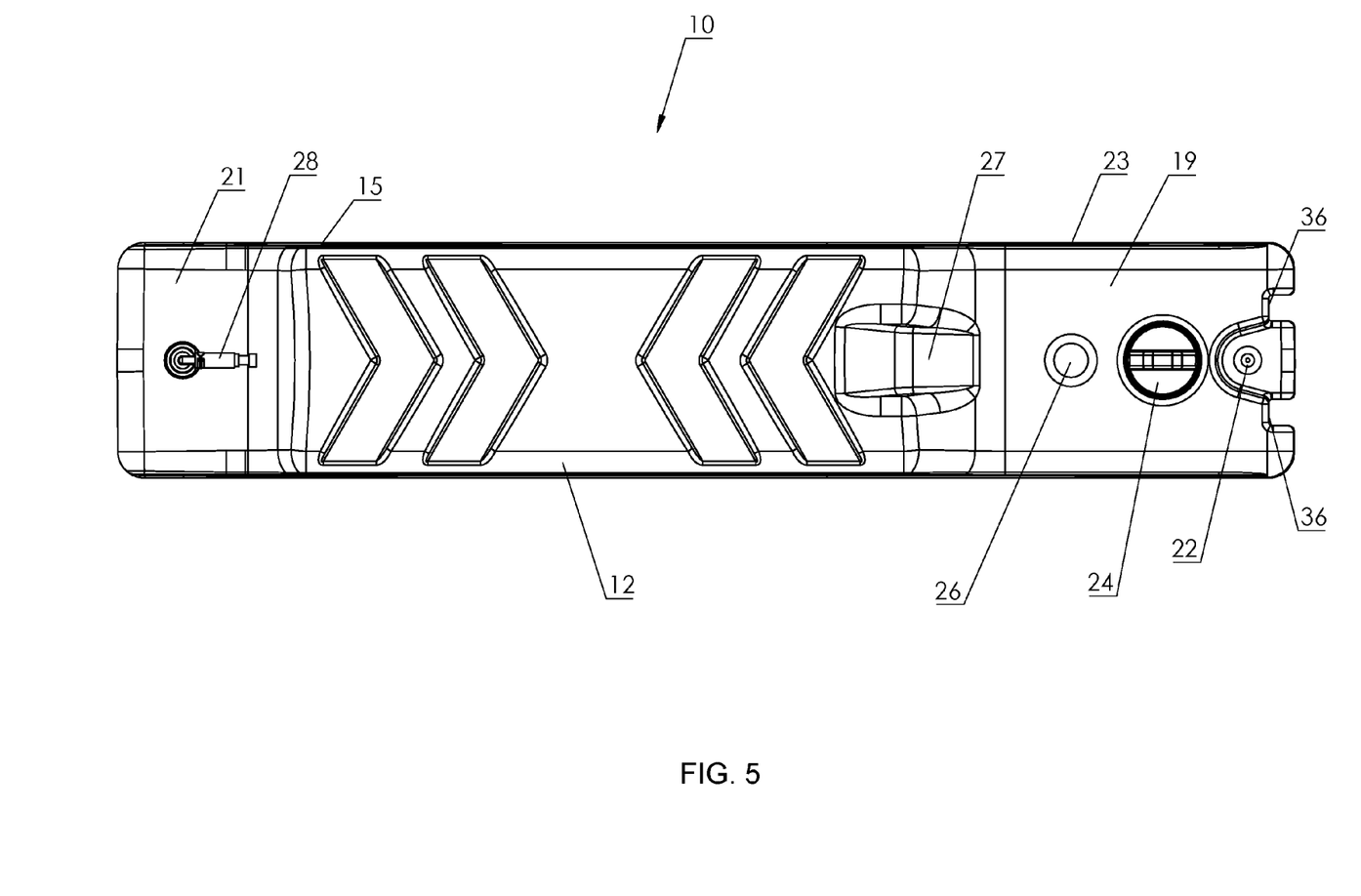
FIG. 5 is a top view of an over the wheel well liquid storage tank.

An additional part of the mounting system is illustrated in FIG. 3. A mounting bumper 52 is located on the bottom of the over the wheel well section 15 of the tank body 12. The mounting bumper 52 is a rubber foot which is threaded onto a threaded member 50. The threaded member 50 which is simply a threaded rod screwed into a bumper mount 56 formed in the bottom of the tank body 12 (see FIG. 6), extends from the bottom of the tank body 12 and ends in the mounting bumper 52. The mounting bumper 52 is intended to sit on the top of the wheel well 62 and provided support to the tank body 12 when the tank 10 is mounted in the bed 60 of a truck. Depending on the height of the wheel well 60, the mounting bumper 52 may be screwed up or down the threaded member 50.

As illustrated in the figures, there are two mounting bumpers 52 located on the bottom of the tank body 12. There are also two mounting channels running the length of each end of the tank body 12. These sets of mounting features allow the over the wheel well tank 10 to be mounted in the bed 60 of the truck with the main tank section 23 towards the front of the truck or towards the rear of the truck. Having two sets of mounting features make the over the wheel well tank 10 reversible allowing the user flexibility in locating and mounting the tank 10.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A liquid storage tank and truck combination comprising:
   a truck comprising a bed;
   a wheel well located in said bed of said truck;
   a tank body coupled in said bed of said truck;
   said tank body comprising a main tank section shaped to fit a location adjacent a wheel well in said bed of said truck;
   said tank body further comprising an over the wheel well tank section shaped to fit a location above a top of said wheel well in said bed of said truck;
   wherein said over the wheel well tank section is in fluid communication with said main tank section;
   a liquid fill opening coupled to said tank body;
   wherein liquid is stored in said main tank section and said over the wheel well tank section;
   a mounting system coupled to said tank body and said bed of said truck; and
   said mounting system comprising:
      at least one mounting channel formed in an end of said over the wheel well tank section and in an end of said main tank section;
      wherein said at least one mounting channel is a long narrow indentation that runs from a location adjacent a top of said tank body to a location adjacent a bottom of said tank body;
      at least one mounting bracket coupled to a bed wall of said bed of said truck and received in said at least one mounting channel; and
      wherein said at least one mounting bracket is received in said at least one mounting channel at any vertical location along said at least one mounting channel.

2. The liquid storage tank and truck combination of claim 1, wherein said over the wheel well tank section and said main tank section form an angle of between 100° and 150°.

3. The liquid storage tank and truck combination of claim 1, wherein said liquid fill opening is located in a lower elevation to prevent said liquid fill opening from rising above a wall of said bed of said truck.

4. The liquid storage tank and truck combination of claim 1, wherein said liquid storage tank is mounted with said main tank section located adjacent said wheel well towards a front of said truck or towards a back of said truck.

5. The liquid storage tank and truck combination of claim 1, wherein said mounting system further comprises at least one indentation formed in a side of said tank body and at least one angle iron received in said at least one indentation and coupled to a bed floor of said bed of said truck.

6. The liquid storage tank and truck combination of claim 1, wherein said at least one mounting bracket may be received in different vertical locations along said at least one mounting channel in order for said tank body to be mounted in different makes and models of said truck.

7. The liquid storage tank and truck combination of claim 1, wherein when said tank body is mounted in said bed of said truck, two of said at least one mounting channels receive said at least one mounting bracket.

8. A liquid storage tank and truck combination comprising:
   a truck having a bed and a cab;
   said bed having a front of said bed adjacent said cab and a wall of said bed perpendicular said front of said bed;
   a wheel well located adjacent said wall of said bed of said truck;
   a tank body shaped to fit adjacent to and above a top of said wheel well in said bed of said truck;
   a liquid fill opening coupled to said tank body;
   a mounting system coupled to said tank body and to said truck; and
   said mounting system comprising:
      at least two channels coupled to each of two ends of said tank body;
      at least one mounting bracket for coupling to said at least one channel and to said wall of said bed of said truck;
      at least one indentation coupled to at least one side of said tank body;
      at least one angle iron coupled to said at least one indentation and said bed of said truck; and
      at least one adjustable bumper for supporting said tank body above said wheel well in said bed of said truck.

9. The liquid storage tank and truck combination of claim 8, wherein said tank body is non-metallic.

10. The liquid storage tank and truck combination of claim 8, further comprising a grounding wire coupled to said tank body and to said truck.

11. The liquid storage tank and truck combination of claim 8, wherein a top of said tank body is a height of a top of said wall of said bed of said truck and wherein said top of said tank body further comprises multiple elevations in order to prevent attachments to said tank body from being taller than said wall of said bed of said truck.

12. The liquid storage tank and truck combination of claim 8, wherein said mounting system couples said tank body to a floor of said bed of said truck and to said wall of said bed of said truck.

13. A liquid storage tank and truck combination comprising:
- a truck;
- a bed on said truck, wherein said bed comprises a wall and a floor;
- a wheel well located in said bed of said truck;
- a tank body comprising a main tank portion shaped to fit in an area adjacent said wheel well in said bed of said truck and an over the wheel well tank portion shaped to fit above a top of said wheel well in said bed of said truck;
  - wherein said main tank portion is shaped to fit in an area adjacent a proximal side of said wheel well or in an area adjacent a distal side of said wheel well;
- a mounting system coupled to said tank body;
  - wherein said mounting system couples said tank body to said floor and said wall of said bed of said truck with said main tank portion in an area adjacent said proximal side of said wheel well or in an area adjacent said distal side of said wheel well;
- said mounting system comprising at least two mounting channels formed in an end of said main tank portion and at least two mounting channels formed in an end of said over the wheel well tank portion;
  - wherein when said tank body is mounted with said main tank portion in an area adjacent said proximal side of said wheel well a mounting bracket is coupled to said wall of said bed of said truck and received in one of said at least two mounting channels located closest to said wall of said bed of said truck;
  - wherein when said tank body is mounted with said main tank portion in an area adjacent said distal side of said wheel well said mounting bracket is coupled to said wall of said bed of said truck and received in a second of said at least two mounting channels; and
- a liquid fill opening coupled to said tank body.

14. The liquid storage tank and truck combination of claim 13, further comprising a grounding wire coupled to said tank body and to said truck.

15. The liquid storage tank and truck combination of claim 13, wherein said main tank section and said over the wheel well section form an angle of 132.5° to allow clearance for said wheel well in multiple makes and models of said truck.

16. The liquid storage tank and truck combination of claim 13, wherein said mounting system further comprises an adjustable bumper abutting said top of said wheel well.

17. The liquid storage tank and truck combination of claim 13, wherein said mounting bracket may be received in different vertical locations along said at least two mounting channels in order to allow said tank body to be mounted in different makes and models of said truck.

* * * * *